J. FORBES.

Skates.

No. 5,705. Reissued Dec. 23, 1873.

Witnesses.

Jam. Frohnitt

James H. Hunter

Inventor:

John Forbes

A.M. PHOTO-LITHOGRAPHIC CO. N.Y. (OSBORNES PROCESS)

UNITED STATES PATENT OFFICE.

JOHN FORBES, OF HALIFAX, NOVA SCOTIA.

IMPROVEMENT IN SKATES.

Specification forming part of Letters Patent No. 40,745, dated December 1, 1863; reissue No. 5,705, dated December 23, 1873; application filed June 23, 1873.

*To all whom it may concern:*

Be it known that I, JOHN FORBES, of Halifax, in the Province of Nova Scotia, have invented certain new and useful Improvements in Skates; and I do hereby declare that the following is a full, clear, and exact description thereof, reference being had to the drawings accompanying this specification and making part of the same.

My improvements relate, first, to a central lever, by means of which the heel and sole clamping devices are brought into operation simultaneously; second, to a plate operating the lugs, made adjustable to the central longitudinal lever, to which it is attached, and from which it receives motion, so that the lugs may be adjusted to their proper movement, having reference to the width of the sole which they are required to grasp; third, to the foot-plate, pivoted or hinged to the runner, and retained in position at the back of the runner and released therefrom by a proper mechanism.

Figure 1:
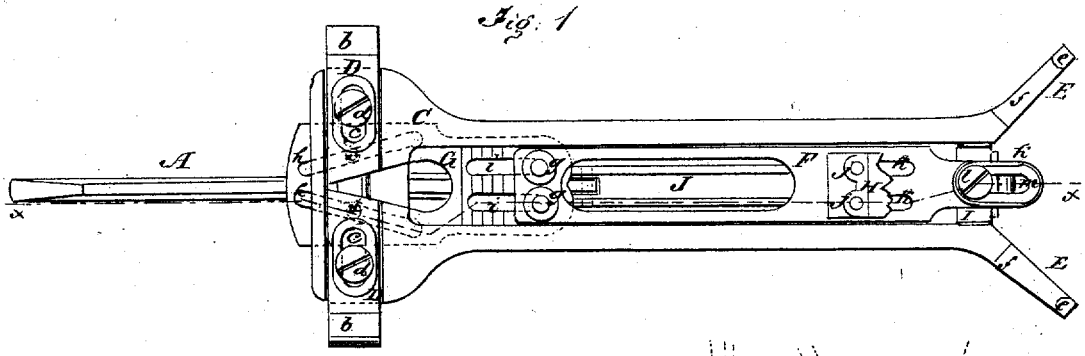
Figure 2:
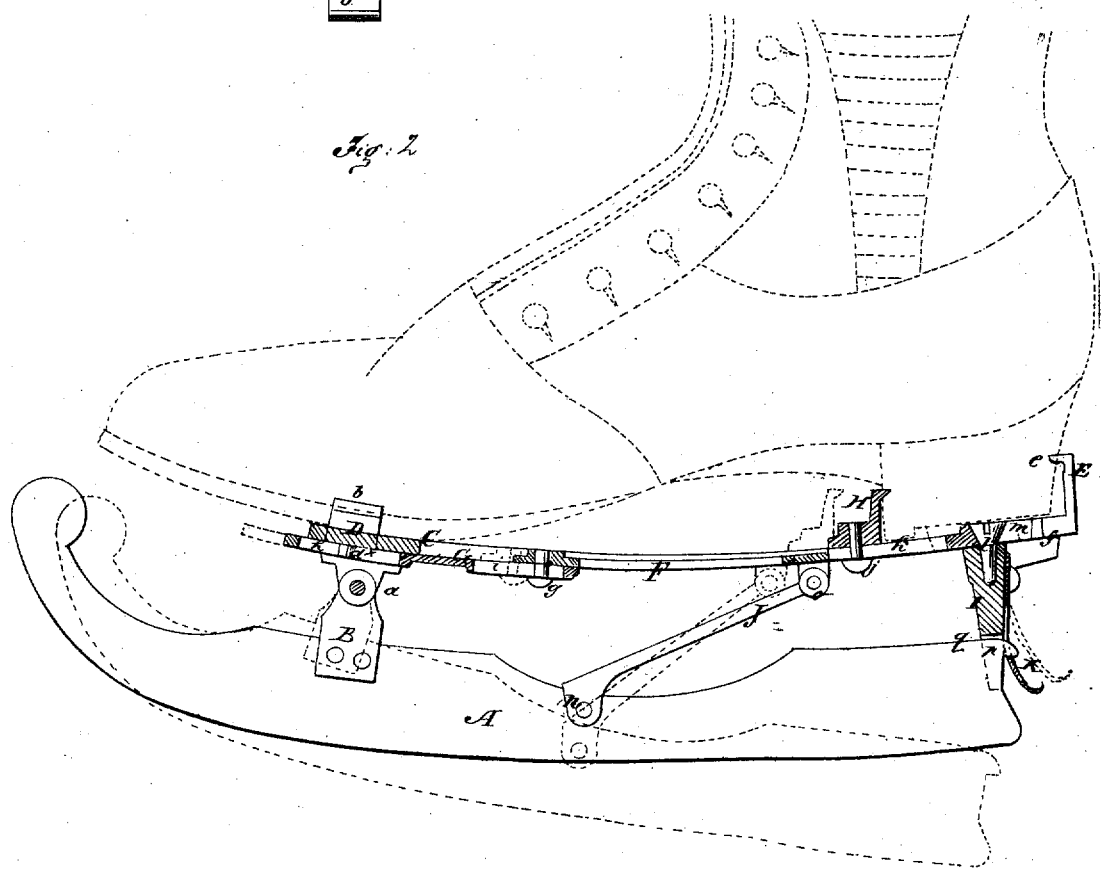

In the drawings, which serve to illustrate my improvement, Figure 1 is a plan view of a skate made according to my invention. Fig. 2 is a vertical sectional view taken in the line *x x* of Fig. 1.

A represents the runner of the skate; B, the front knee or post, which is firmly secured to the runner, and has the front part of the foot-plate C attached to its upper end by a hinge or joint, *a*. In the upper surface of the foot-plate C, at its front part, there are made grooves, in which lugs D D are fitted and allowed to slide freely. These lugs D D are curved upward at their outer end to form clamps or jaws *b b*, and said lugs have each an oblong slot, *c*, made longitudinally in it, and through these slots screws *d* pass into the foot-plate, said screws retaining the lugs D D in proper position on the foot-plate, while the oblong slots *c c* admit of the lugs working a suitable distance in the grooves in the foot-plate. To the back end of the foot-plate C there are attached two clamps, E E, one at each side. These clamps are formed of upright bars, bent over and inward at their upper ends to form spurs *e*, to enter the heel of the boot or shoe, the upright bars being at the ends of horizontal projections *f*, which extend obliquely outward from the foot-plate. The foot-plate C has a large oblong opening made in it, in which a sliding central lever, F, is fitted, and to the front end of this lever F there is attached, by screws *g g*, a plate, G, which has two oblique slots, *h h*, in it, the front ends of said slots being nearer to each other than the back ends. In these slots *h h* pendent pins $a^{\times}$, at the inner ends of the lugs D D, are fitted. The plate G also has two longitudinal parallel slots, *i i*, made in it, through which the screws *g g* pass, and these slots *i* admit of the plate G being adjusted farther forward or backward, as may be required, for the proper movement in and out of the lugs. To the back part of the lever F there is attached, by screws *j j*, a clamp, H, constructed with a toothed or serrated edge, being in a transverse position on the lever F. This clamp may be adjusted farther forward or backward on the lever F by the screws *j*, which pass through oblong slots *k k*. The back part of the lever F rests on the upper end of a pendant, I, situated at the back end of the foot-plate C, and a screw, *l*, passes, through an oblong slot, *m*, in the lever F, into the upper end of the pendant. This slot *m* is of sufficient length to admit of a requisite degree of longitudinal play or movement of the lever F. J is another lever, the lower end of which is secured, by a pivot, *n*, to the runner A. The upper end of this lever J is connected, by a joint, *o*, to the lever F. At the back end of the runner A, at its upper part, there is a small projection, *p*, which, when the foot-plate C is adjusted in proper position, fits within a vertical slot or recess, *q*, in the pendant I, and is retained therein and released therefrom by a catch, K, formed of a spring having a slot made in it to admit of said projection *p* on the runner passing through it. The catch K is secured, by screws, to the rear or outer side of the pendant I.

From the above description, it will be seen that by drawing outward the spring-catch K, so as to disengage the back end of the runner A, the back part of the foot-plate C may be raised, or the back end of the runner A lowered; and by this movement of either of the aforesaid parts the lever F will be actuated by the connecting-lever J, and the clamp or jaws *b b* will be forced outward by reason of the pendent pins $a^{\times}$ of the plates D D working in the oblique slots *h h*. The clamp H will, at the same time, also be moved forward or from the clamps E E. This position of the several parts is shown in dotted lines in Fig. 2.

When the several parts are in this position, the skate is adjusted to the boot or shoe, the heel fitting between the clamps E E and H, and the forward part of the sole fitting between the clamps or jaws *b b*. The back part of the foot-plate is then forced down, or the back part of the runner A drawn upward, which causes the clamps *b b* to approach each other and grasp the sole, while the clamp H will, at the same time, be forced backward, so that the heel of the boot or shoe will be grasped between the clamps H E E; and when the projection *p* of the runner is caught by the catch K, the runner and the foot-plate will be firmly connected and the skate securely fastened to the boot or shoe.

By adjusting the clamp H farther forward or backward on the lever F, and adjusting the plate G farther forward or backward, the clamps *b b* H E E may be made to clamp or grasp boots or shoes of different sizes.

By this invention the skate is secured to the sole of the boot or shoe at all points simultaneously, and very expeditiously.

I would remark that the sole-plate C may be pivoted to the runner A, either at the front or back end of the former. The arrangement, however, would be substantially the same in either case.

I claim—

1. A central lever, J, substantially as described, connecting the sole and heel clamps, and through which both are operated simultaneously.

2. A central lever, arranged to operate substantially as above described, when combined with a lever which actuates it in connecting and disconnecting the skate.

3. A plate arranged to operate said lugs, when made adjustable to the central lever, substantially as described, so that the lugs may be adjusted to receive a movement in accordance with the width of the sole they are required to grasp.

4. The foot-plate, pivoted or hinged at one end to the runner, and secured and released at the other end by a catch, K, or other suitable fastening mechanism, substantially as described.

Witnesses: JOHN FORBES.

SAM. TRO. SMITH,

JAMES H. HUNTER.